United States Patent [19]
Gold et al.

[11] Patent Number: 6,088,990
[45] Date of Patent: Jul. 18, 2000

[54] NON-WELDED SUPPORT FOR INTERNAL IMPACT TYPE PARTICLE SEPARATOR

[75] Inventors: Michael Gold, North Benton; David J. Walker, Wadsworth; David E. James, Barberton, all of Ohio

[73] Assignee: The Babcock & Wilcox Compnay, New Orleans, La.

[21] Appl. No.: 09/058,102

[22] Filed: Apr. 9, 1998

[51] Int. Cl.$^7$ .................................................. B01D 45/00
[52] U.S. Cl. ............................ 52/702; 52/429; 122/4 D
[58] Field of Search .............................. 52/295, 702, 712, 52/731.7; 55/429, 430, 434, 444–446; 122/4 D

[56] References Cited

U.S. PATENT DOCUMENTS

| | | |
|---|---|---|
| 4,538,549 | 9/1985 | Stromberg . |
| 4,594,017 | 6/1986 | Hills ..................................... 52/702 X |
| 4,686,939 | 8/1987 | Stromberg . |
| 4,891,052 | 1/1990 | Belin et al. . |
| 4,951,611 | 8/1990 | Abdulally et al. . |
| 4,992,085 | 2/1991 | Belin et al. . |
| 5,025,755 | 6/1991 | Eickvonder et al. . |
| 5,092,097 | 3/1992 | Young ...................................... 52/702 |
| 5,249,404 | 10/1993 | Leek et al. ............................. 52/702 |
| 5,343,830 | 9/1994 | Alexander et al. . |
| 5,467,570 | 11/1995 | Leek ........................................ 52/712 |

OTHER PUBLICATIONS

U.S. application No. 08/326,416, filed Oct. 20, 1994 "Reduced Height Internal Impact Type Particle :Separator".

*Primary Examiner*—Richard Chilcot
*Attorney, Agent, or Firm*—Robert J. Edwards; Daniel S. Kalka; Eric Marich

[57] ABSTRACT

A weldless connection system for U-beam particle separators is provided in which one end of each U-beam is provided with sides and a back that are separated from each other forming tabs. The tabs may be bent, or folded, about 90° inward toward the channel formed by the U-beam. The back tab may be twice as long as the side tabs, and the extra half length of the tab can be folded about 180° back at the back of the U-beam in a double thickness. Each tab has a hole therethrough. The double-length back tab has two holes; one hole is provided through each half. When the tabs are bent inward, the holes align. A bolt and washer placed through the aligned holes may be used to secure the tabs, and thus the U-beam, to a furnace roof structure. An alternate embodiment of the invention is provided in which only the sides of the U-beam form tabs which extend past the bottom of the U-beam.

14 Claims, 3 Drawing Sheets

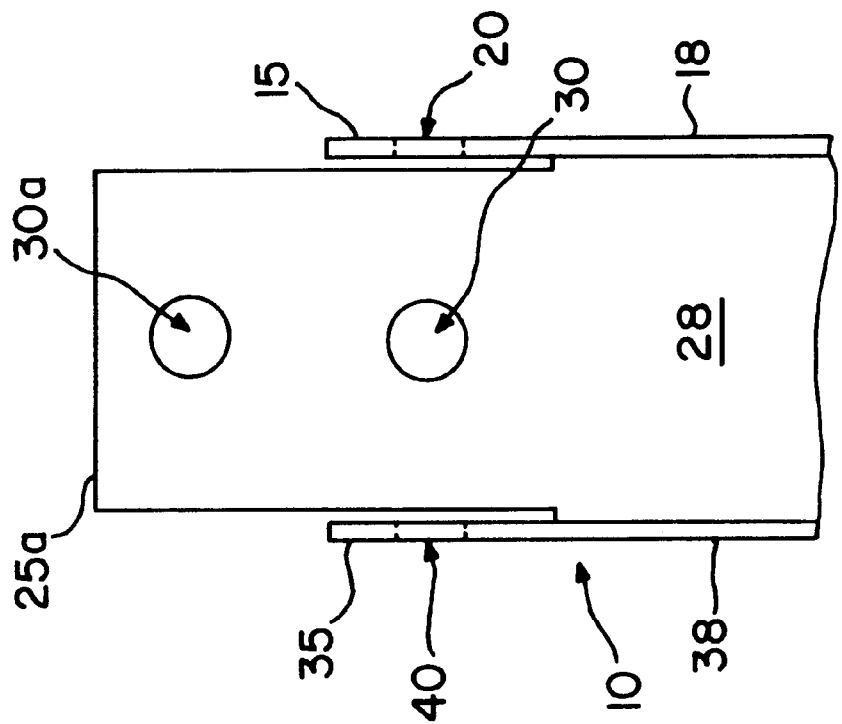
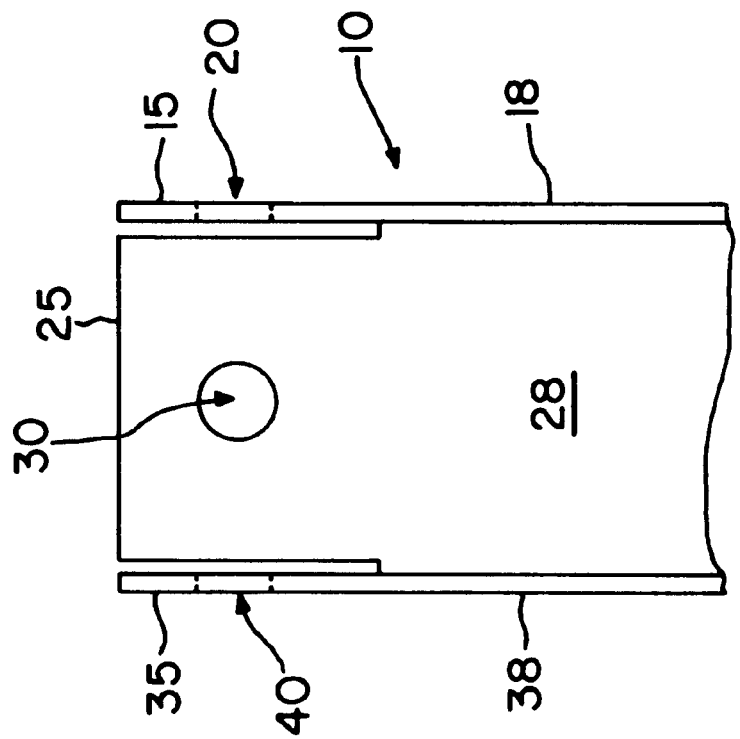

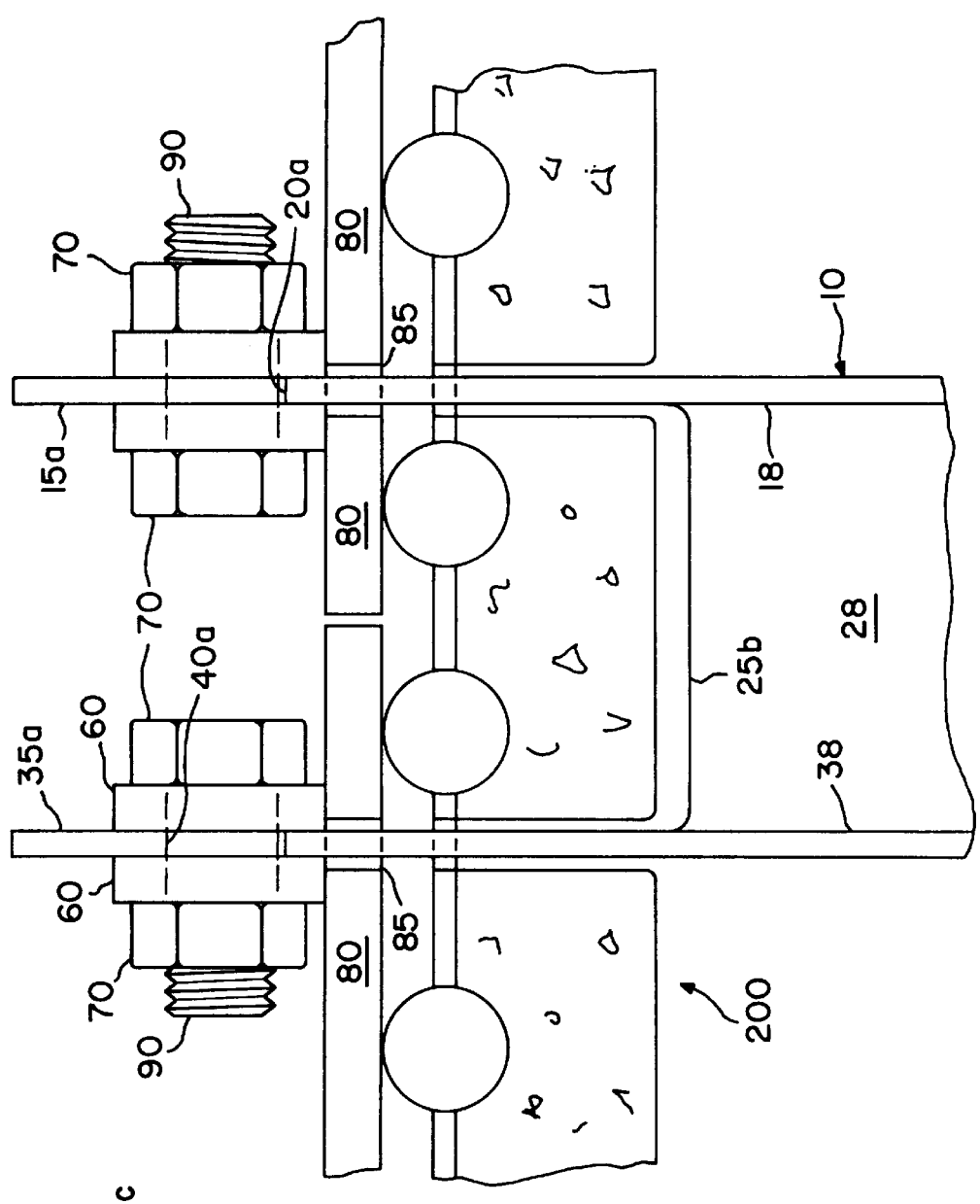

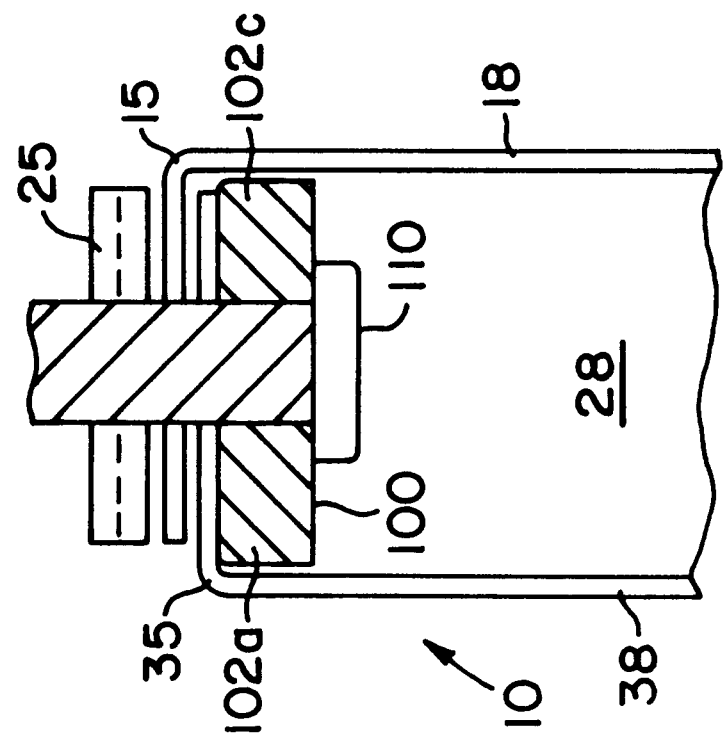
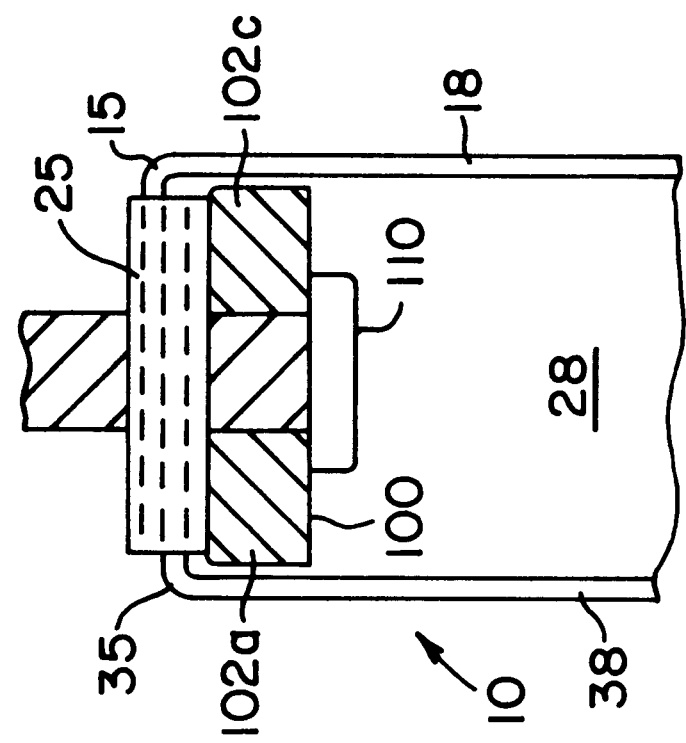

NON-WELDED SUPPORT FOR INTERNAL IMPACT TYPE PARTICLE SEPARATOR

BACKGROUND OF THE INVENTION

1. Field of Invention

The present invention relates generally to particle separation in flue gases produced by power generation furnace and boiler processes, and in particular to a new and useful method of supporting impact type particle separators within various furnace environments.

2. Description of the Related Art

Impact type particle separators are well known for use in combustion furnaces, and circulating fluidized bed boilers and/or reactors. Impact separators are also commonly referred to as concave impingement members or U-beams. U.S. Pat. Nos. 4,891,052, 4,992,085 and 5,343,830 describe conventionally supported impact type particle separators and their uses in greater detail.

Generally, a furnace will have an arrangement of U-beams for separating particles from flue gases. U-beams are normally not cooled, but can be. Instead, they are constructed of high alloy sheet metal with the chemical properties selected to maximize resistance to oxidation and to other corrosive gases commonly found in furnaces and fluidized beds. It is known, for example, to construct U-beams from type 310 stainless steel (nominally 25Cr-20Ni) sheet metal, among other austenitic materials steels and/or alloys when operating in temperatures in excess of approximately 1200° F. Typically, the U-beams are suspended from structural members located above the furnace enclosure. The attachment devices are normally welded to the U-beams to provide means for supporting the weight of the U-beams.

In some applications, it is sometimes desirable to increase the gas temperature in the region of the U-beams in the circulating fluidized bed boiler and/or reactor to temperatures reaching or exceeding approximately 1750° F. At temperatures of this magnitude, it is difficult to identify weld filler metals and processes that will produce weld deposits having sufficient strength, oxidation resistance and corrosion resistance to withstand the stresses produced by such an extreme environment.

SUMMARY OF THE INVENTION

It is an object of the present invention to provide a simple and effective method of supporting impact type particle separators, such as U-beams, within a furnace without being subject to the problems and limitations associated with known welded support connections.

Accordingly, a weldless (non-welded) connection and support system for U-beam particle separators is provided in which one end of each U-beam is provided with sides and a back that are separated from each other by forming tabs. The tabs may be bent, or folded, about 90° inward toward the channel formed by the U-beam. The back tab may be twice as long as the side tabs, and the extra half length of the tab folded 180° over inwards towards the back of the U-beam in a double thickness to enclose the other tabs.

Each tab has a hole therethrough. The double-length back tab has two holes—one hole through each half. When the tabs are bent inward, the holes align. A bolt and washer placed through the aligned holes may be used to secure the tabs, and thus the U-beam, to a furnace roof structure.

An alternate embodiment of the invention is provided in which only the sides of the U-beam form tabs which extend past the back of the U-beam. The side tabs are inserted through slots in the roof of a furnace. Each side tab has a hole therethrough. A bolt and washer can be used to secure the side tabs outside the furnace.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a front elevational view of a U-beam of the invention;

FIG. 2 is a front elevational view of an alternate embodiment of the U-beam of the invention;

FIG. 3 is a sectional front elevational view of the U-beam of FIG. 1 in use;

FIG. 3A is a top plan view of the washer shown in FIG. 3; and

FIG. 3B is a front elevational view of another embodiment of the invention;

FIG. 3C is a front elevational view of another embodiment of the invention;

FIG. 4 is a front elevational view of a another embodiment of the U-beam in use.

DESCRIPTION OF THE PREFERRED EMBODIMENTS

Referring now to the drawings, in which like reference numerals are used to refer to the same or similar elements, FIG. 1 shows an end of a U-beam 10 of the invention having left side wall 38, right side wall 18 and back wall 28 forming a channel therebetween. Each wall 18, 28, 38 has a portion, or tab 15, 25, 35, which is separated from the adjacent tab. A small gap is provided between the back tab 25 and the two side tabs 15, 35.

Each tab 15, 25, 35 has a fastener opening 20, 30, 40, respectively, through the middle of the tab 15, 25, 35. Any suitable fastener including but not limited to a rod, pin, stud, or bolt may be passed through the opening. As seen in FIG. 3, the tabs 15, 25, 35 may be bent inward toward the U-beam channel approximately 90°. The tabs 15, 25, 35 are bent with an appropriate radius of curvature of the folded tabs so that the corners formed by the bends are not sharp creases, but rather are generous and smooth. When the tabs 15, 25, 35 are bent or folded inward in succession in an overlapping manner, the fastener openings 20, 30, 40 are aligned. Preferably, back tab 25 is bent inward last over both the right and left tabs 15, 35.

A fastener for example bolt 110 may be inserted through the aligned bolt openings 20, 30, 40 to secure the U-beam 10 to a furnace structure, such as the furnace roof or a support beam (not shown). A shaped washer 100, preferably constructed of similar material as U-beam 10 and approximately square, with rounded corners 102a, 102b, 102c, such as shown in FIG. 3A may be used with the bolt 110 to hold the U-beam 10 in place. The rounded corners 102a, 102b, 102c conform to the gradual bends formed by the tabs 15, 25, 35 to provide a snug fit against whichever tab 15, 25, 35 is folded inward first. The washer 100 has a bolt hole 105 through its middle which aligns with the bolt openings 20, 30, 40 in the tabs 15, 25, 35.

In an alternate embodiment shown in FIG. 2, the tab 25a connected to back wall 28 is about twice the length of the side tabs 15, 35. Double length tab 25a has two bolt openings 30, 30a through its thickness. One bolt opening 30, 30a is provided in each half of tab 25a at approximately the center.

The double length tab 25a may be folded 90° over the side tabs 15, 35, and then the extra half may be folded 180° back toward the bottom wall 28 on the other side of tabs 15, 35. See FIG. 3B. The bolt openings 20, 30, 30a, 40 all align when tabs 15, 25a, 35 are folded properly. The U-beam 10 may be connected to a furnace roof or other support in a similar manner as the previous embodiment.

Alternatively, the extra half of back tab 25a may be folded back against itself, forming a double thick bottom tab 25a, which is then bent inward 90° over the right and left tabs 15, 35. See FIG. 3C.

Of course, the openings 20, 30, 30a, 40, 105 may be drilled through all the tabs and through the shaped washer all at one time, or they may be drilled prior to folding, or even prior to assembly of the washer into the U-beam.

In FIG. 4, another embodiment of the U-beam 10 is shown in which only left and right side walls 18, 38 have tabs 15a, 35a. Back wall 28 lacks a tab and terminates at back wall edge 25b. Each tab 15a, 35a has a fastener opening 20a, 40a therethrough.

U-beam 10 can be fastened to a furnace roof 200, for example, by inserting the tabs 15a, 35a through slots 85 in the roof 200 to a point outside the furnace enclosure, as seen in FIG. 4. Fastener openings 20a, 40a are positioned above furnace roof 200, so that one or more fasteners like bolts 90 may be inserted through bolt openings 20a, 40a and secured using washers 60 and nuts 70. Washers 60 may be square or round and be sized to position the bolt openings 20a, 40a and tabs 15a, 35a above the outside surface of the furnace roof 200. A bearing plate 80 may be employed on the outside surface of the furnace roof 200 to provide additional support and a flat surface for the washers 60 to interact with positioning the bolt openings 20a, 40a.

Of course, fasteners 90 may include means for preventing loosening like for example openings which would allow the fasteners to be wired together. Also, shackles (not shown) may be positioned over tabs 15a, 35a and fixed in place by fasteners 90 to provide additional means for securing the U-beam.

The U-beam 10 according to the invention may be made of conventional ferritic or austenitic materials including steels or alloys, such as the type 310 stainless steel commonly used for U-beams, or 309, 253 MA, etc. The washers 60, 100 are also preferably made of the same material as the U-beam 10, so that they exhibit similar characteristics with regard to resistance to oxidation and corrosion, especially at extreme elevated temperatures. Alternatively, materials such as ceramics may be used for the bolts 90, 110 and washers 60, 100 instead, since a welded connection is not needed. This purely mechanical connection of the U-beams to furnace support structures eliminates the need for welds and allows materials to be matched for particular operating conditions.

Further, the bolt openings 20, 20a, 30, 30a, 40, 40a, 105 may all be drilled or formed individually prior to use, or simultaneously once the tabs 15, 15a, 25, 25a, 35, 35a are folded inward and shaped washer 100 is positioned for connection. Any known bolt-type fastener may be substituted for bolts 90, 110, such as rods, pins, studs. The fastener can be made of the same material as the U-beam, or other materials having similar chemical and physical properties.

While a specific embodiment of the invention has been shown and described in detail to illustrate the application of the principles of the invention, it will be understood that the invention may be embodied otherwise without departing from such principles.

What is claimed is:

1. A U-beam impact type particle separator for a furnace constructed to be supported by a fastener within the furnace to a furnace roof structure, the particle separator comprising:
   a U-beam having a left side, a right side and a back forming a channel therebetween, a portion of the back being separated from each of the left and right sides at one end of the U-beam, such that the portions of the back, left side and right side which are separated from a left tab, a right tab and a back tab, each of the left tab, right tab and back tab having an opening therethrough at approximately the middle of the tab, whereby, when the tabs are bent inward toward the channel at approximately 90°, the openings are aligned for a fastener.

2. A particle separator according to claim 1, wherein the back tab is about twice the length of each of the left and right tabs, the back tab having two equal sized halves, each half having an opening through approximately the middle of the half, such that when the left, right and back tabs are each bent at approximately 90° inward toward the channel, one half of the back tab extends past the left and right tabs and the extended half is bent at approximately 180° back toward the back such that the openings are all aligned.

3. A particle separator according to claim 2, wherein the extended half of the back tab is bent at approximately 180° surrounding the left and right tabs.

4. A particle separator according to claim 3, wherein the approximate 90° bends made by the left, right and back tabs are each formed as a rounded corner between each tab and the corresponding wall.

5. A particle separator according to claim 2, wherein the extended half of the back tab is folded against the other half of the back tab.

6. A particle separator according to claim 5, wherein the approximate 90° bends made by the left, right and back tabs are each formed as a rounded corner between each tab and the corresponding wall.

7. A particle separator according to claim 1, wherein the approximate 90° bends made by the left, right and back tabs are each formed as a rounded corner between each tab and the corresponding wall.

8. A particle separator according to claim 7, wherein the U-beam is made of an austenitic material.

9. A nonwelded support connection for supporting a U-beam impact type particle separator from a roof of a furnace, the nonwelded support connection comprising:
   a U-beam having a left side, a right side and a back forming a channel therebetween, a portion of the back being separated from each of the left and right sides at one end of the U-beam, such that the portions of the back, left side and right side which are separated form a left tab, a right tab and a back tab, each of the left tab, right tab and back tab having an opening therethrough at approximately the middle of the tab, whereby, when the tabs are bent inward toward the channel approximately 90°, the openings are aligned, and the approximate 90° bends made by the left, right and back tabs are each formed as a rounded corner between each tab and corresponding wall;
   a washer having rounded top edges conforming to the rounded corners formed by the bent tabs and a bolt hole through approximately the center of the washer, the washer positioned adjacent the tabs within the channel, such that the hole is aligned with the aligned openings; and fastener means for inserting through the aligned openings and hole to secure the washer and U-beam to the roof of the furnace.

10. A nonwelded support connection according to claim 9, wherein the washer is made of an austenitic material.

11. A nonwelded support connection according to claim 9, wherein the back tab is about twice the length of each of the left and right tabs, the back tab having two equal sized halves, each half having a hole through approximately the middle of the half, such that when the left, right and back tabs are each bent approximately 90° inward toward the channel, one half of the back tab extends past the left and right tabs and the extended half is bent approximately 180° back toward the back such that the openings are all aligned.

12. A nonwelded support connection according to claim 11, wherein the extended half of the back tab is bent approximately 180° surrounding the left and right tabs.

13. A nonwelded support connection according to claim 11, wherein the extended half of the back tab is folded against the other half of the back tab.

14. A U-beam impact type particle separator for a furnace constructed to be supported by at least one fastener without welding from a roof of the furnace, the particle separator comprising:

a U-beam having a left side, a right side and a back forming a channel therebetween, the left and right sides at one end of the U-beam extending past the back forming left and right tabs, respectively, each tab having an opening therethrough, the openings being aligned with each other, the left and right tabs being of a length such that when each side is inserted through one of a pair of slots in the furnace roof, the openings are positioned outside the roof of the furnace, whereby a fastener is used to secure the U-beam from the roof of the furnace.

* * * * *